United States Patent
Kurata

(10) Patent No.: US 9,982,124 B2
(45) Date of Patent: May 29, 2018

(54) PHOTOCURABLE ELASTOMER COMPOSITION, GASKET FOR HARD DISK DRIVE, AND HARD DISK DRIVE

(71) Applicant: BRIDGESTONE CORPORATION, Chuo-ku, Tokyo (JP)

(72) Inventor: Toshihiko Kurata, Yokohama (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 88 days.

(21) Appl. No.: 14/762,877

(22) PCT Filed: Feb. 4, 2014

(86) PCT No.: PCT/JP2014/000585
§ 371 (c)(1),
(2) Date: Jul. 23, 2015

(87) PCT Pub. No.: WO2014/119341
PCT Pub. Date: Aug. 7, 2014

(65) Prior Publication Data
US 2015/0361256 A1 Dec. 17, 2015

(30) Foreign Application Priority Data

Feb. 4, 2013 (JP) ................... 2013-019671
Feb. 4, 2013 (JP) ................... 2013-019683
Feb. 4, 2013 (JP) ................... 2013-019717

(51) Int. Cl.
| | | |
|---|---|---|
| C08L 47/00 | (2006.01) |
| F16J 15/10 | (2006.01) |
| C09K 3/10 | (2006.01) |
| C08L 23/14 | (2006.01) |
| G11B 33/14 | (2006.01) |
| C08F 255/04 | (2006.01) |
| C08F 255/10 | (2006.01) |
| C08F 287/00 | (2006.01) |
| C09D 151/00 | (2006.01) |
| C08L 51/00 | (2006.01) |
| C08F 290/04 | (2006.01) |

(52) U.S. Cl.
CPC ........... *C08L 47/00* (2013.01); *C08F 255/04* (2013.01); *C08F 255/10* (2013.01); *C08F 287/00* (2013.01); *C08L 23/142* (2013.01); *C08L 51/006* (2013.01); *C09D 151/003* (2013.01); *C09K 3/1006* (2013.01); *F16J 15/102* (2013.01); *G11B 33/1466* (2013.01); *C08F 290/048* (2013.01); *C08L 2201/14* (2013.01); *C08L 2203/20* (2013.01); *C08L 2205/02* (2013.01); *C09K 2003/1062* (2013.01); *C09K 2200/0625* (2013.01)

(58) Field of Classification Search
CPC ...... C08L 47/00; C08L 51/006; C08L 23/142; C09D 151/003; C08F 255/10; C08F 287/00; C08F 255/04; C08F 290/048; C08F 220/18; C08F 2200/1883; C08F 2200/1875; G11B 33/1466; C09K 3/1006; C09K 2003/1062; F16J 15/102
See application file for complete search history.

(56) References Cited

U.S. PATENT DOCUMENTS

| | | | | |
|---|---|---|---|---|
| 8,152,947 B2* | 4/2012 | Toyoda | ................. | G02F 1/1333 156/247 |
| 2009/0186552 A1* | 7/2009 | Shinya | .............. | G02F 1/133502 445/58 |
| 2010/0003425 A1* | 1/2010 | Kamata | ............. | G02F 1/133308 428/1.5 |
| 2010/0097552 A1* | 4/2010 | Shinya | ................... | C09J 109/00 349/122 |
| 2010/0097746 A1* | 4/2010 | Toyoda | ............. | G02F 1/133308 361/679.01 |
| 2010/0098839 A1* | 4/2010 | Toyoda | ................ | C09D 133/02 427/64 |
| 2010/0178834 A1* | 7/2010 | Toyoda | ................. | G02F 1/1333 445/24 |
| 2011/0244218 A1* | 10/2011 | Suzuki | ...................... | C08F 2/44 428/323 |
| 2012/0118483 A1* | 5/2012 | Toyoda | ................ | G02F 1/1333 156/98 |
| 2013/0302539 A1* | 11/2013 | Fujii | .................... | C08F 220/10 428/1.54 |

(Continued)

FOREIGN PATENT DOCUMENTS

| | | |
|---|---|---|
| EP | 2647652 A1 | 10/2013 |
| JP | 7-33837 A | 2/1995 |

(Continued)

OTHER PUBLICATIONS

May 20, 2014 International Search Report issued in International Patent Application No. PCT/JP2014/000585.
May 20, 2014, Notification of Reason(s) for Refusal issued by the Japan Patent Office in the corresponding Japanese Patent Application No. 2013-019671.
May 20, 2014, Notification of Reason for Refusal issued by the Japan Patent Office in the corresponding Japanese Patent Application No. 2013-019683.

(Continued)

*Primary Examiner* — Sanza Mcclendon
(74) *Attorney, Agent, or Firm* — Kenja IP Law PC

(57) ABSTRACT

Disclosed is a photocurable elastomer composition that exhibits, when cured, excellent flexibility and barrier properties and has low compression set. The photocurable elastomer composition may comprise components (A) to (D) such that the mass ratio of the component (A) to the component (B) ((A):(B)) is from 25:75 to 75:25, and that the content of the component (C) is 50 mass % or less based on the total content of the components (A), (B), and (C).

6 Claims, No Drawings

(56) References Cited

U.S. PATENT DOCUMENTS

2014/0248898 A1* 9/2014 O'Brien ............... H04W 4/046
 455/456.1

FOREIGN PATENT DOCUMENTS

| | | |
|---|---|---|
| JP | 2005-060465 A | 3/2005 |
| JP | 2008-291127 A | 12/2008 |
| JP | 2009-043295 A | 2/2009 |
| JP | 2009-221329 A | 10/2009 |
| JP | 2010-106121 A | 5/2010 |
| JP | 2010-260918 A | 11/2010 |
| JP | 2012-116931 A | 6/2012 |
| JP | 2013-245256 A | 12/2013 |
| WO | 2006/001522 A1 | 1/2006 |
| WO | 2008/146658 A1 | 12/2008 |
| WO | 2012073688 A1 | 6/2012 |

OTHER PUBLICATIONS

May 20, 2014, Notification of Reason(s) for Refusal issued by the Japan Patent Office in the corresponding Japanese Patent Application No. 2013-019717.

* cited by examiner

PHOTOCURABLE ELASTOMER COMPOSITION, GASKET FOR HARD DISK DRIVE, AND HARD DISK DRIVE

TECHNICAL FIELD

This disclosure relates to photocurable elastomer compositions, gaskets for hard disk drives, and hard disk drives.

BACKGROUND ART

In recent years, gaskets are used in hard disk drives (which may be hereinafter simply referred to as "HDDs") of computers, recording devices, and the like, for dustproof purpose and for preventing entry of water vapor.

An easiest way to improve water vapor barrier properties (which may be hereinafter simply referred to as "barrier properties") of a gasket is to increase the hardness of the gasket. However, since such a gasket is, in use, compressed by the members to be adhered or sealed, flexibility is also required from a durability standpoint.

Materials for ultraviolet-curable gaskets include epoxy acrylates, urethane acrylates, and the like (see, for example, JP2010-260918A (PTL 1), JP2009-43295A (PTL 2), and JP2009-221329A (PTL 3)).

CITATION LIST

Patent Literature

PTL 1: JP2010-260918A
PTL 2: JP2009-43295A
PTL 3: JP2009-221329A

SUMMARY

Technical Problem

However, while epoxy acrylates have good barrier properties because of their high hardness, there is room for improvement in terms of flexibility. On the other hand, some urethane acrylates have good flexibility, yet there is room for further improvement in terms of barrier properties.

Further, a gasket for HDDs needs to have a property such that it can release the adhesion between adherends (also referred to as adherend materials), or delaminate the adherends, after having been sealed to each other, and can then be used to reseal the adherends to each other. In other words, so-called reworkability is required.

We found that high compression set (poor compression set property) might lead to insufficient bonding or sealing when using a same gasket for HDDs to release and restore the adhesion, and sufficient reworkability could not be obtained. Therefore, low compression set (good compression set property) is necessary for a satisfactory reworkability.

It could thus be helpful to provide a photocurable elastomer composition that exhibits, when cured, excellent flexibility and barrier properties as well as low compression set.

It could also be helpful to provide a gasket for hard disk drives that exhibits excellent flexibility and barrier properties and has low compression set.

It could also be helpful to provide a hard disk drive that exhibits excellent durability and barrier properties, and that has sufficient reworkability because of its low compression set properties.

Solution to Problem

A photocurable elastomer composition disclosed herein comprises:

(A) a component selected from the following (A-1) to (A-3):

(A-1) a liquid polymer containing, in its molecule, 80% or more of units derived from at least one selected from the group consisting of a hydrogenated polyisoprene, a hydrogenated polybutadiene, a hydrogenated styrene-butadiene copolymer, and an ethylene-propylene copolymer, (A-2) a liquid polybutene, or a liquid polymer containing, in its molecule, 80% or more of units derived from at least one selected from the group consisting of a hydrogenated polybutadiene containing 70% or more of 1,2-bond and a hydrogenated polyisoprene containing 70% or more in total of 1,2-bond and 3,4-bond, and (A-3) a styrenic thermoplastic elastomer;

(B) a polymer having two or more reactive functional groups per molecule, the reactive functional groups being of at least one type selected from the group consisting of (meth)acrylic group, vinyl group, vinylidene group, and maleimide group;

(C) a (meth)acrylate monomer; and (D) a photopolymerization initiator, wherein the mass ratio of the component (A) to the component (B) ((A):(B)) is from 25:75 to 75:25, and the content of the component (C) is 50 mass % or less based on the total amount of the components (A), (B), and (C).

The aforementioned specific liquid polymer or elastomer, component (A), may impart excellent flexibility and barrier properties to a cured product of the photocurable elastomer composition disclosed herein.

In addition, when the mass ratio of the component (A) to the component (B) ((A):(B)) is from 25:75 to 75:25, the photocurable elastomer composition has low compression set when cured, while guaranteeing excellent flexibility and barrier properties.

Further, when the content of the component (C) is 50 mass % or less based on the total amount of the components (A), (B), and (C), the photocurable elastomer composition may exhibit excellent formability and flexibility at the same time when cured.

As used herein, preferred examples of "light" relating to the terms "photocurable" and "photopolymerization" include: ultraviolet rays; visible light; charged particle beams such as α rays, β rays, and electron beams; electromagnetic waves such as γ rays; and ionizing radiation including high-energy particles. Among these, preferred are ultraviolet rays.

As used herein, unless otherwise specified, the term "number average molecular weight" refers to the number average molecular weight expressed in terms of standard polystyrene measured by gel permeation chromatography (GPC).

As used herein, the term "units derived from a hydrogenated polyisoprene" refers to such units that constitute a hydrogenated product of polyisoprene and are represented by the following formula (I), (II), or (III):

[Chem. 1]

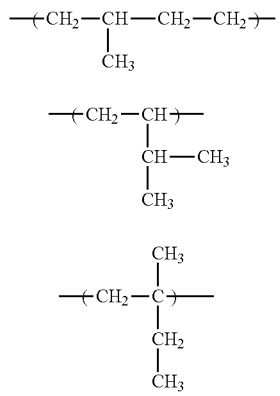

As used herein, the term "units derived from a hydrogenated polybutadiene" refers to such units that constitute a hydrogenated product of polybutadiene and are represented by the following formula (IV) or (V):

[Chem. 2]

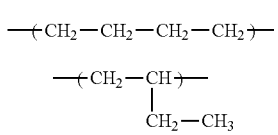

As used herein, the term "units derived from a hydrogenated styrene-butadiene copolymer" refers to such units that only consist of styrene units represented by formula (VI) below and units constituting a hydrogenated product of polybutadiene represented by formula (IV) above, and that have at least one of the styrene units and at least one of the units constituting the hydrogenated product of polybutadiene bonded to each other:

[Chem. 3]

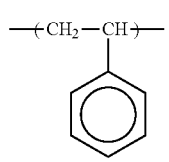

As used herein, the term "units derived from an ethylene-propylene copolymer" refers to the units that only consist of ethylene units represented by formula (VII) below and propylene units represented by formula (VIII), and that have at least one of the ethylene units and at least one of the propylene units bonded to each other.

[Chem. 4]

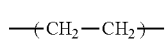

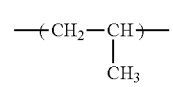

As used herein, the term "units derived from a hydrogenated polybutadiene containing 70% or more of 1,2-bond" refers to such units that only consist of units constituting hydrogenated products of polybutadiene represented by formulas (IV) and (V) above, respectively, where the ratio that the constituent units of (V) occupy in the overall molecule is 70% or more.

As used herein, the term "units derived from a hydrogenated polyisoprene containing 70% or more in total of 1,2-bond and 3,4-bond" refers to such units that only consist of units constituting a hydrogenated product of polyisoprene represented by formulas (I), (II), and (III) above, where the ratio that the constituent units of (II) and (III) occupy in the overall molecule is 70% or more in total.

In this disclosure, NMR peak ratio can be used to determine the following proportions: the proportion in the component (A-1) of the units derived from at least one selected from the group consisting of a hydrogenated polyisoprene, a hydrogenated polybutadiene, a hydrogenated styrene-butadiene copolymer, and an ethylene-propylene copolymer; the proportion in the component (A-2) of the units derived from at least one selected from the group consisting of the hydrogenated polybutadiene and the hydrogenated polyisoprene; and the proportion in the polymer (B) of the units derived from at least one selected from the group consisting of polyisoprene, polybutadiene, a styrene-butadiene copolymer, and hydrogenated products thereof, as well as an ethylene-propylene copolymer.

As used herein, the term "liquid" indicates that the component has fluidity at the forming temperature, for example, room temperature (25° C.).

As used herein, the term "(meth)acrylic group" refers to at least one of acrylic group and methacrylic group. Also, the term "(meth)acrylate" refers to at least one of acrylate and methacrylate.

As used herein, the term "acrylic group" represents ($CH_2$=CH—CO—), "methacryl group" represents ($CH_2$=C($CH_3$)—CO—), and "vinyl group" represents ($CH_2$=CH—).

As used herein, the term "maleimide group" refers to a monovalent functional group represented by the following formula (IX):

[Chem. 5]

As used herein, the term "gasket" is synonymous with a sealing material, a sealer, or a packing. Also, as used herein, unless otherwise specified, the term "gasket" is intended to include both fixing seal (static seal) and dynamic seal.

In the photocurable elastomer composition disclosed herein, the component (B) is preferably a polymer that contains, in its molecule, 80% or more of units derived from at least one selected from the group consisting of polyisoprene, polybutadiene, a styrene-butadiene copolymer, and hydrogenated products thereof, as well as an ethylene-propylene copolymer. The use of such component (B) imparts even lower compression set and better barrier properties to a cured product of the photocurable elastomer composition.

In the photocurable elastomer composition, the component (C) is preferably at least one (meth)acrylate selected from the group consisting of hydrocarbon (meth)acrylate having 6 or more carbon atoms, isobornyl (meth)acrylate, and (meth)acrylate derived from dicyclopentadiene. The use of such component (C) may provide higher flexibility and better barrier properties. It also provides excellent compatibility and toughness.

Preferably, the photocurable elastomeric composition further comprises, as the component (E), at least one selected from an inorganic filler or an organic filler. The use of such component (E) imparts pseudoplasticity to the photocurable elastomer composition, improving formability of the photocurable elastomer composition.

In the photocurable elastomer composition, the component (E) is preferably a fumed silica. The use of a fumed silica as the component (E) is advantageous in providing excellent pseudoplasticity.

The photocurable elastomeric composition is suitably used as a gasket for hard disk drives.

The gasket for hard disk drives disclosed herein may use the aforementioned photocurable elastomer composition in at least a portion thereof. The use of the photocurable elastomer composition in at least a portion of the gasket for hard disk drives provides the gasket with excellent flexibility and barrier properties as well as low compression set.

The hard disk drive disclosed herein may comprise the aforementioned gasket for hard disk drives in at least a portion thereof. The provision of the gasket for hard disk drives in at least a portion of the hard disk drive provides the hard disk drive with excellent durability and barrier properties as well as sufficient reworkability.

Advantageous Effect

It could thus be helpful to provide a photocurable elastomer composition that exhibits, when cured, excellent flexibility and barrier properties and has low compression set. In addition, according to this disclosure, it is possible to provide a gasket for hard disk drives that exhibits excellent flexibility and barrier properties and has low compression set. Furthermore, according to the disclosure, it is possible to provide a hard disk drive that exhibits excellent durability and barrier properties and has sufficient reworkability.

DETAILED DESCRIPTION

Photocurable Elastomer Composition

One of the preferred embodiments of the photocurable elastomer composition disclosed herein will now be described in detail below. The photocurable elastomer composition disclosed herein comprises: (A) a component selected from the aforementioned (A-1) to (A-3); (B) a polymer having two or more reactive functional groups per molecule, the reactive functional groups being of at least one type selected from the group consisting of (meth)acrylic group, vinyl group, vinylidene group, and maleimide group; (C) a (meth)acrylate monomer; and (D) a photopolymerization initiator, wherein the mass ratio of the component (A) to the component (B) ((A):(B)) is from 25:75 to 75:25, and the content of the component (C) is 50 mass % or less based on the total amount of the components (A), (B), and (C).

The aforementioned specific liquid polymer, component (A), may impart excellent flexibility and barrier properties to a cured product of the photocurable elastomer composition.

In addition, when the mass ratio of the component (A) to the component (B) ((A):(B)) is from 25:75 to 75:25, the resulting photocurable elastomer composition has low compression set when cured, while guaranteeing excellent flexibility and barrier properties.

Further, when the content of the component (C) is 50 mass % or less based on the total amount of the components (A), (B), and (C), the photocurable elastomer composition may exhibit excellent formability and flexibility at the same time when cured. In the following, the components (A) to (D) of the photocurable elastomer composition and other components that may be contained if appropriate are described.

Component (A)

The component (A) is selected from (A-1) a liquid polymer containing, in its molecule, 80% or more of units derived from at least one selected from the group consisting of a hydrogenated polyisoprene, a hydrogenated polybutadiene, a hydrogenated styrene-butadiene copolymer, and an ethylene-propylene copolymer, (A-2) a liquid polybutene, or a liquid polymer containing, in its molecule, 80% or more of units derived from at least one selected from the group consisting of a hydrogenated polybutadiene containing 70% or more of 1,2-bond and a hydrogenated polyisoprene containing 70% or more in total of 1,2-bond and 3,4-bond, or (A-3) a styrene-based thermoplastic elastomer.

Component (A-1)

The component (A) may be (A-1), i.e., a liquid polymer containing, in its molecule, 80% or more of units derived from at least one selected from the group consisting of a hydrogenated polyisoprene, a hydrogenated polybutadiene, a hydrogenated styrene-butadiene copolymer, and an ethylene-propylene copolymer.

In addition to the above units, the component (A-1) may also contain, in its molecule, other components such as a modifier used in synthesis of the component (A-1). When the component (A-1) contains the above units in an amount of 80% or more, the photocurable elastomer composition more often exhibits excellent flexibility and barrier properties when cured.

The component (A-1) is usually a non-reactive (non-crosslinkable) liquid polymer, since it contains, in its molecule, 80% or more of units derived from at least one selected from the group consisting of a hydrogenated polyisoprene, a hydrogenated polybutadiene, a hydrogenated styrene-butadiene copolymer, and an ethylene-propylene copolymer. While the component (A-1), preferably, does not contain a reactive functional group such as a (meth)acrylic group, it may contain a reactive functional group such as (meth)acrylic group, without departing from the scope of the disclosure.

As discussed above, the component (A-1) is in liquid form. If the component (A-1) is in solid form, it is difficult to mix with other components.

The number-average molecular weight of the component (A-1) is not particularly limited as long as it is within the range in which barrier properties can be guaranteed. However, in terms of making the viscosity of the photocurable elastomer composition moderate to increase productivity, the number-average molecular weight of the component (A-1) is preferably 50,000 or less, and in terms of suppressing bleed-out (transition) of the component (A-1) onto surfaces of a cured product of the photocurable elastomer composition, the number-average molecular weight is preferably 20,000 or more. As such, the number-average molecular weight is more preferably from 20,000 to 50,000. The component (A-1) may be of a single type or a combination of two or more.

Commercially available products of this component (A-1) include, for example, LUCANT® HC-3000X (trade name, an ethylene-propylene copolymer having a number-average molecular weight of 3,000), which is available from Mitsui Chemicals Co., Ltd., and KRASOL® HLBH-P2000 (trade name, a hydrogenated polybutadiene having a number-average molecular weight of 2,000) and HLBH-P3000 (trade name, a hydrogenated polybutadiene having a number-average molecular weight of 3,000), which are available from Arkema Company.

Component (A-2)

The component (A) may be (A-2), i.e., a liquid polybutene, or a liquid polymer containing, in its molecule, 80% or more of units derived from at least one selected from the group consisting of a hydrogenated polybutadiene containing 70% or more of 1,2-bond and a hydrogenated polyisoprene containing 70% or more in total of 1,2-bond and 3,4-bond.

That is, the component (A-2) is any of a liquid polybutene, a liquid polymer containing, in its molecule, 80% or more of units derived from a hydrogenated polybutadiene containing 70% or more of 1,2-bond, or a liquid polymer containing, in its molecule, 80% or more of units derived from a hydrogenated polyisoprene containing 70% or more in total of 1,2 bond and 3,4-bond.

In addition to the above units, the component (A-2) may also contain in its molecule other components such as a modifier used in synthesis of the component (A-2). When the component (A-2) is a liquid polybutene, or when the component (A-2) contains, in its molecule, 80% or more of units derived from at least one selected from the group consisting of a hydrogenated polybutadiene containing 70% or more of 1,2-bond and a hydrogenated polyisoprene containing 70% or more in total of 1,2-bond and 3,4-bond, the photocurable elastomer composition more often exhibits excellent flexibility and barrier properties when cured.

The component (A-2) has the aforementioned composition, and is usually a non-reactive (non-crosslinkable) liquid polymer. While the component (A-2), preferably, does not contain a reactive functional group such as a (meth)acrylic group, it may contain a reactive functional group such as (meth)acrylic group, without departing from the scope of the disclosure.

As discussed above, the component (A-2) is in liquid form. If the component (A-2) is in solid form, it is difficult to mix with other components.

The number-average molecular weight of the component (A-2) is not particularly limited as long as it is within the range in which barrier properties can be guaranteed. However, in terms of making the viscosity of the photocurable elastomer composition moderate to increase productivity, the number-average molecular weight is preferably from 2,000 to 20,000. The component (A-2) may be of a single type or a combination of two or more.

Commercially available products of this component (A-2) include, for example, HV-100 (trade name, a polybutene having a number-average molecular weight of 980), HV-300 (trade name, a polybutene having a number-average molecular weight of 1,400), and HV-1900 (trade name, a polybutene having a number-average molecular weight of 2,900), which are all available from JX Nippon Oil & Energy Corporation, and BI-2000 (trade name, a high-vinyl hydrogenated polybutadiene having a number average molecular weight of 2,100) and BI-3000 (trade name, a high-vinyl hydrogenated polybutadiene having a number-average molecular weight of 3,100), which are all available from Nippon Soda Co., Ltd.

Component (A-3)

The component (A) may be (A-3), i.e., a styrene-based thermoplastic elastomer. When the styrene-based thermoplastic elastomer is used, the photocurable elastomer composition more often exhibits excellent flexibility and barrier properties when cured. Examples of the styrenic thermoplastic elastomer include: unsaturated styrenic thermoplastic elastomer, such as a polystyrene-polybutadiene-polystyrene block copolymer (SBS), a polystyrene-polyisoprene-polystyrene block copolymer (SIS), a polystyrene-poly(vinyl/polyisoprene)-polystyrene block copolymer (high-vinyl SIS), and a polystyrene-poly(isoprene/ethylene)-polystyrene block copolymer (SIES), and partially hydrogenated products thereof; and a fully saturated styrenic thermoplastic elastomer, such as a polystyrene-polyisobutylene-polystyrene block copolymer (SIBS), a polystyrene-poly(ethylene/butylene)-polystyrene block copolymer (SEBS), a polystyrene-poly(ethylene/propylene)-polystyrene block copolymer (SEPS), a polystyrene-poly(vinyl/ethylene/propylene)-polystyrene (high-vinyl SEPS), and a polystyrene-poly(ethylene/ethylene/propylene)-polystyrene (SEEPS). Among these, from the viewpoint of water vapor barrier properties, a partially hydrogenated, unsaturated styrenic thermoplastic elastomer and a fully saturated, styrenic thermoplastic elastomer are preferred. It is also preferred that the amount of styrene units in the styrenic thermoplastic elastomer, which is the component (A-3), is preferably 15% or more from the perspective of guaranteeing barrier properties and preventing adsorption of impure substances in the air, such as siloxane, and is preferably 35% or less in terms of flexibility and compatibility.

Commercially available products of this component (A-3) include, for example, SIBSTAR® 073T (SIBS), which is available from Kaneka Corporation, and HYBRAR® 7125 (high-vinyl SEPS), SEPTON® 2007 (SEPS), SEPTON® 4077, and SEPTON® 8007 (SEBS), which are all available from Kuraray Co., Ltd.

In the photocurable elastomer composition disclosed herein, the mass ratio of the component (A) to the component (B) described below ((A):(B)) is from 25:75 to 75:25. This allows the photocurable elastomer composition to have low compression set when cured, while guaranteeing excellent flexibility and barrier properties. The component (A) has hydrophobicity resulting from a hydrocarbon-based skeleton and has a bulky skeleton, which increases both amorphous nature and excluded volume, and decreases the diffusion rate of water vapor, resulting in excellent barrier properties (however, the component (A), when present independently, tends to flow under stress and remain as a permanent set). On the other hand, the component (B) recovers, by means of cross-linking, its original shape to a certain degree after the stress is removed, utilizing the entropic elasticity of the component (B) itself, and provides low compression set properties accordingly. When the mass ratio of the component (A) to the component (B) is within the aforementioned specific range, cross-linking density and cross-linking heterogeneity are moderate (in other words, the component (A) will not adversely affect the recovery of the component (B) using its entropic elasticity even when the component (A) is trapped in gaps in the cross-linked structure of the component (B)). Consequently, low compression set properties are obtained, while guaranteeing excellent flexibility and barrier properties.

Note that the mass ratio ((A):(B)) is preferably from 25:75 to 55:45 in the case of selecting the component (A-3) as the component (A), yet in each case the mass ratio ((A):(B)) is more preferably from 25:75 to 50:50 from the viewpoint of obtaining low compression set properties.

Component (B)

The component (B) is a polymer having two or more reactive functional groups per molecule, the reactive functional groups being of at least one type selected from the group consisting of (meth)acrylic group, vinyl group, vinylidene group, and maleimide group. The component (B) contributes to reducing compression set of a cured product of the photocurable elastomer composition.

The component (B) has two or more reactive functional groups per molecule, the reactive functional groups being of at least one type selected from the group consisting of (meth)acrylic group, vinyl group, vinylidene group, and maleimide group. These reactive functional groups are advantageous in providing good photoactivity under ultraviolet rays, and so on. In addition, having two or more such reactive functional groups per molecule is advantageous in that a three-dimensional cross-linking is formed and compression set is reduced. In the component (B), the number of reactive functional groups per molecule is 2 or more, and preferably 2 to 6.

More preferably, the number-average molecular weight of the component (B) is 3,000 or more to 20,000 or less. Within this range, the hardness of a cured product of the photocurable elastomer composition can be kept properly, and the viscosity of the photocurable elastomer composition can be kept low, resulting in increased productivity.

Examples of the component (B) include UC-102 (trade name, a methacrylic-modified polyisoprene having a number-average molecular weight of 17,000, and containing 2 reactive functional groups in side chains) and UC-203 (trade name, a methacrylic-modified polyisoprene having a number-average molecular weight of 35,000, and containing 3 reactive functional groups in side chains), which are available from Kuraray Co., Ltd., and CN-307 (trade name, an acrylic-modified polybutadiene having a number-average molecular weight of 3,500, and containing 2 reactive functional groups), which is available from Arkema Inc. The component (B) may be of a single type or a combination of two or more.

In the photocurable elastomer composition disclosed herein, the component (B) is preferably a polymer containing, in its molecule, 80% or more of units derived from at least one selected from the group consisting of polyisoprene (IR), polybutadiene (BR), and a styrene-butadiene copolymer (SBR), and hydrogenated products thereof, as well as an ethylene-propylene copolymer (EP). That is, in the photocurable elastomer composition, the component (B) is preferably a polymer that contains, in its molecule, 80% or more of units derived from polyisoprene, a hydrogenated polyisoprene, polybutadiene, a hydrogenated polybutadiene, a styrene-butadiene copolymer, a hydrogenated styrene-butadiene copolymer, or an ethylene-propylene copolymer. The use of such component (B) imparts even lower compression set and better barrier properties to a cured product of the photocurable elastomer composition.

In this case, the component (B) may be any polymer as long as it contains, in its molecule, 80% or more of the aforementioned units, and may contain other components such as a modifier used in synthesis of the component (B), or may be a end-modified polymer or a polymer containing units other than the above or repeating units (for example, a block copolymer).

Examples of such component (B) include UC-102 and UC-203 (both trade name), which are available from Kuraray Co., Ltd., and CN-307 (trade name), which is available from Arkema Company.

Among these, the component (B) is preferably a polymer containing, in its molecule, 80% or more of units derived from at least one selected from the group consisting of polyisoprene, polybutadiene, and a styrene-butadiene copolymer, which are not hydrogenated (i.e., having a carbon-carbon unsaturated bond), as well as an ethylene-propylene copolymer. Such non-hydrogenated polymers are advantageous as they are inexpensive, readily available, and low in viscosity, and require less time for synthesis process. Examples of such component (B) having a carbon-carbon unsaturated bond include UC-102 and UC-203 (both trade name), which are available from Kuraray Co., Ltd., and CN-307 (trade name), which is available from Arkema Company.

The content of the component (B) may be adjusted as appropriate within the aforementioned range of mass ratio in relation to the component (A), depending on the use, use conditions, required performance, and the like.

Component (C)

The component (C) is a (meth)acrylate monomer, which serves to adjust viscosity, in addition to serving to impart photocurability (formability) to the photocurable elastomer composition disclosed herein. As the component (C), it is possible to use any (meth)acrylate monomer used in conventionally-known photocurable compositions. The component (C) may be of a single type or a combination of two or more. As the component (C), it is possible to use any (meth)acrylate monomer as long as it has at least one (meth)acrylic group. It is more preferred that the (meth)acrylate monomer has only one (meth)acrylic group from the viewpoint of improving compatibility, flexibility, toughness, and barrier properties in a balanced manner. The molecular weight of the (meth)acrylate monomer as the component (C) may be selected appropriately depending on the use, use conditions, required performance, and the like of the photocurable elastomer composition. A preferred molecular weight is less than 1,000. This setting is more effective in reducing the viscosity of the photocurable elastomer composition.

Examples of (meth)acrylate monomers having a molecular weight of less than 1,000 include n-butyl (meth)acrylate, 2-ethylhexyl (meth)acrylate, cyclohexyl (meth)acrylate, dicyclopentanyl (meth)acrylate, dicyclopentenyl (meth) acrylate, dicyclopentenyloxyethyl (meth)acrylate, diethylene glycol monoethyl ether (meth)acrylate, dimethylaminoethyl (meth)acrylate, dipropylene glycol mono(meth)acrylate, ethoxy diethylene glycol (meth) acrylate, ethoxylated phenyl (meth)acrylate, ethyl (meth)acrylate, isoamyl (meth) acrylate, isobornyl (meth)acrylate, isobutyl (meth)acrylate, isodecyl (meth)acrylate, isooctyl (meth)acrylate, isomyristyl (meth)acrylate, isostearyl (meth)acrylate, n-octadecyl (meth)acrylate, lauroxypolyethylene glycol (meth)acrylate, lauryl (meth)acrylate, methoxy dipropylene glycol (meth) acrylate, methoxy tripropylene glycol (meth)acrylate, methoxypolyethylene glycol (meth)acrylate, and methoxy triethylene glycol (meth)acrylate. Other examples include (meth)acrylate monomers described in PTL 1 to PTL 3.

In the photocurable elastomer composition disclosed herein, the component (C) is preferably at least one (meth) acrylate selected from the group consisting of a hydrocarbon (meth)acrylate having 6 or more carbon atoms, an isobornyl (meth)acrylate, and a (meth)acrylate derived from dicyclopentadiene, and, in the case of selecting the component (A-2) as the component (A), the component (C) is preferably a mono-functional (meth)acrylate. This makes it possible to obtain greater flexibility and barrier properties. Excellent compatibility and toughness are also provided.

Regarding the hydrocarbon (meth)acrylate having 6 or more carbon atoms, the number of carbon atoms is more preferably 6 to 24. The reason is that if the number of carbon atoms is 5 or less, an enhanced polarity may cause a phase separation, and the barrier properties may deteriorate.

The hydrocarbon moiety of the hydrocarbon (meth)acrylate having 6 or more carbon atoms may be linear, branched, or cyclic. Examples of the hydrocarbon (meth)acrylate having 6 or more carbon atoms include n-butyl (meth) acrylate, 2-ethylhexyl (meth) acrylate, lauryl (meth) acrylate, isomyristyl (meth)acrylate, isostearyl (meth)acrylate, n-octadecyl (meth)acrylate, an ester of a (meth)acrylic acid and a polyhydric alcohol.

Examples of the (meth)acrylate derived from dicyclopentadiene include dicyclopentanyl (meth)acrylate, dicyclopentenyl (meth)acrylate, dicyclopentenyloxyethyl (meth)acrylate, and norbornyl (meth) acrylate.

In the photocurable elastomer composition, the content of the component (C) is preferably 50 mass % or less, and more preferably 40 mass % or less based on the total amount of the aforementioned components (A), (B), and (C). The reason is that if the content of the component (C) exceeds 50 mass %, the hardness may excessively increase and the sealability may become worse, and the compression set properties may deteriorate. In addition, the content of the component (C) is preferably 1 mass % or more, more preferably 5 mass % or more, and particularly preferably 10 mass % or more, based on the total amount of the components (A), (B), and (C). Further, when the component (A-3) is selected as the component (A), the content of the component (C) is most preferably 30 mass % or more based on the total amount of the components (A), (B), and (C). The reason is that if the content of the component (C) is less than 1 mass %, the viscosity becomes too high to ensure a sufficient formability during dispensing. The content of the component (C) may be adjusted as appropriate within the aforementioned range of mass ratio, depending on the use, use conditions, required performance, and the like.

Component (D)

The component (D) is a photopolymerization initiator, which serves to initiate and/or promote photopolymerization or curing of photocurable components (e.g., the components (A) to (C)).

As the photopolymerization initiator, for example, it is possible to use any of components used in conventionally-known photocurable compositions, such as those described in PTL 1 to PTL 3.

Examples of the component (D) include: benzoin alkyl ether-based photopolymerization initiators such as benzoin ethyl ether, benzoin isobutyl ether, and benzoin isopropyl ether; acetophenone-based photopolymerization initiators such as 2,2-diethoxy acetophenone and 4'-phenoxy-2,2-dichloro acetophenone; propiophenone-based photopolymerization initiators such as 2-hydroxy-2-methyl propiophenone, 4'-isopropyl-2-hydroxy-2-methyl propiophenone, and 4'-dodecyl-2-hydroxy-2-methyl propiophenone; alkyl phenone-based photopolymerization initiators such as benzyl dimethyl ketal, 1-hydroxycyclohexyl phenyl ketone, and 1-[4-(2-hydroxyethoxy)-phenyl]-2-hydroxy-2-methyl-1-propane-1-one; anthraquinone-based photopolymerization initiators such as 2-ethyl anthraquinone and 2-chloro anthraquinone; and photopolymerization initiators of intramolecular cleavage type, such as acylphosphine oxide-based photopolymerization initiators. Among these, preferred are anthraquinone-based photopolymerization initiators such as 1-hydroxycyclohexyl phenyl ketone, and propiophenone-based photopolymerization initiators such as 2-hydroxy-2-methyl propiophenone. Other examples of the component (D) include benzophenone/amine-based photopolymerization initiators, Michler's ketone/benzophenone-based photopolymerization initiators, and photopolymerization initiators of hydrogen abstraction type, such as thioxanthone/amine-based photopolymerization initiators.

Among these photopolymerization initiators, particularly preferred is 1-hydroxycyclohexyl phenyl ketone (Irgacure® 184, trade name, available from BASF).

The photopolymerization initiator as the component (D) may be of a single type or a combination of two or more.

The content of the photopolymerization initiator may be adjusted as appropriate depending on the type, content, and the like of the photocurable components in the photocurable elastomer composition. For example, the content of the photopolymerization initiator is usually 0.1 to 10 parts by mass, more preferably 0.5 to 5 parts by mass, and even more preferably 0.5 to 3 parts by mass based on the total amount of 100 parts by mass of the photocurable components (e.g., the components (A) to (C)). Additionally, the aforementioned photopolymerization initiator may be used in combination with a well-known photosensitizing agent.

If the content of the photopolymerization initiator is less than 0.1 parts by mass, this is less effective in contributing to the initiation of photopolymerization, and if it is more than 10 parts by mass, deep-part curability may deteriorate and the initiator may not be fully dissolved, resulting in increased costs.

Optional Components

The photocurable elastomer composition disclosed herein may further contain, for example, without departing from the scope of the disclosure, the following optional components: a component (E) (an inorganic filler, an organic thixotropicity-applying agent (a thixotropic agent)); a coupling agent; an antioxidant (an anti-aging agent); a light stabilizer; carbodiimides (a moisture/heat/aging resistant agent); a fatty acid such as stearic acid (a lubricant); a fatty acid metal salt such as calcium stearate (a lubricant); a fatty acid amide such as amide stearate (a thickener); a fatty acid ester (a plasticizer); a polyolefin wax, an internal mold release agent such as a paraffin wax; a softening agent such as process oil; a coloring agent; a leveling agent; and a solvent.

Examples of the coupling agent, the antioxidant (anti-aging agent), and the light stabilizer include those described in PTL 1 and PTL 2.

The component (E) will be further described below.

Component (E)

Preferably, the photocurable elastomeric composition disclosed herein further comprises, as the component (E), at least one selected from an inorganic filler or an organic filler. The use of such component (E) imparts pseudoplasticity to the photocurable elastomer composition, improving formability of the photocurable elastomer composition.

Examples of the inorganic filler include silica ($SiO_2$), alumina, and titania, as well as complex oxides and layered oxides thereof; and clay minerals. Among these, more preferred is silica. More specific examples include silica fine powder micronized by a dry method (e.g., Aerosil 300, trade name, available from Nippon Aerosil Co., Ltd.). In the photocurable elastomer composition, the aforementioned inorganic filler is preferably a fumed silica. The use of a fumed silica is advantageous in providing excellent pseudoplasticity. Examples of the fumed silica include HDK N20 (trade name, available from Asahi Kasei Wacker Silicone Co., Ltd.).

The mean particle size of the inorganic filler is more preferably 5 µm to 50 µm, and more preferably 5 µm to 12 µm, from the viewpoint of imparting thickening and pseudoplastic properties. The mean particle size of the inorganic filler may be determined by a method such as BET adsorption or SEM. When the photocurable elastomer composition contains such an inorganic filler, the content thereof may be adjusted appropriately, and is preferably 0.1 to 30 parts by mass, and more preferably 1 to 15 parts by mass, based on the total amount of 100 parts by mass of the photocurable elastomer composition.

As the organic filler (organic thixotropicity-applying agent), it is possible to use any of conventionally-known organic fillers, including, for example, hydrogenated castor oil, amide wax, and mixtures thereof. Specific examples include those described in JP2012-72204A.

Viscosity of Photocurable Elastomer Composition

The photocurable elastomer composition disclosed herein preferably has a viscosity of 1 Pa·s to 10,000 Pa·s at a temperature of 50° C. and a shear rate of $1.0 \text{ s}^{-1}$. By setting the viscosity within the aforementioned range, the photocurable elastomer composition exhibits a moderate fluidity, has good handling properties, and is capable of forcing the shape of the elastomer composition to follow the shape of a desired sealing material such as a gasket, to thereby retain the shape of the sealing material. The viscosity of the photocurable elastomer composition is more preferably 10 Pa·s to 2,000 Pa·s, and even more preferably 30 Pa·s to 1,000 Pa·s.

Viscosity Measurement Method

Viscosity is measured by using a rheometer, "RS-600" (available from Haake). The temperature of the photocurable elastomer composition is adjusted to 50° C., and shear stress is measured while changing the shear rate in the range of $1 \text{ s}^{-1}$ to $10 \text{ s}^{-1}$ with the gap of 0.2 mm. Then, the least square method is used to produce approximate lines from a Casson plot, plotting the square root of shear rate and the square root of shear stress, to calculate the viscosity at $1 \text{ s}^{-1}$.

Method of Preparing Photocurable Elastomer Composition

No particular limitation is placed on the method of preparing the photocurable elastomer composition disclosed herein, and any well-known method may be used. For example, the aforementioned components (A) to (D) and optional components may be prepared by being kneaded with a temperature-adjustable kneader (e.g., a single-screw extruder, a twin-screw extruder, a planetary mixer, a high shear mixer, or the like).

Use of the Photocurable Elastomer Composition

The photocurable elastomer composition disclosed herein may be used for, for example, gaskets for HDDs; sealing members for ink tanks; various computers such as desktop computers, laptop computers, and tablet computers, mobile phones, liquid crystal display devices, organic EL displays, various display devices such as electronic paper and plasma displays, and sealing materials for electronics such as cameras; sealing materials for automotive parts, water purification devices, air purification devices, stirrers, speakers, and pumps; sealing materials for anti-vibration devices, waterproof devices, dampers, and structures for civil engineering and construction; and packings such as O-rings.

The photocurable elastomeric composition is suitably used for a gasket for hard disk drives. The reason is, as mentioned above, that the photocurable elastomer composition is excellent in flexibility and barrier properties, and may exhibit lower compression set.

Gasket for Hard Disk Drives

In the gasket for hard disk drives disclosed herein, the aforementioned photocurable elastomer composition may be used in at least a portion thereof. That is, the gasket for hard disk drives contains in at least a portion thereof a cured product that is obtained by curing the aforementioned photocurable elastomer composition by irradiating it with light such as ultraviolet rays. The use of the photocurable elastomer composition in at least a portion of the gasket for hard disk drives provides the gasket with excellent flexibility and barrier properties as well as low compression set.

The thickness of the gasket may be adjusted appropriately depending on the use, and is typically about 0.1 mm to 2 mm.

Regarding the flexibility, the gasket for HDDs preferably has a JIS-A hardness, which will be described later, of 80 or less, more preferably 20 to 50, and even more preferably 30 to 50, from the viewpoint of both flexibility and barrier properties of the gasket.

The barrier properties of the gasket for HDDs may be adjusted appropriately depending on the use.

Regarding the barrier properties of the gasket for HDDs, moisture permeability is preferably 10 or less, as will be discussed later.

Regarding the compression set of the gasket for HDDs, the gasket preferably has a compression set of 50% or less, more preferably 30% or less, and even more preferably 20% or less, as will be discussed later.

Method of Producing a Gasket for Hard Disk Drives

A gasket for hard disk drives may be produced by applying the photocurable elastomer composition to an adherend, and curing the adherend by irradiating it with light.

The adherend may be selected appropriately depending on the use, and may be, for example, a metal or a hard resin.

A metal adherend is preferred in terms of formability.

No particular limitation is placed on the metal as the adherend, and any conventionally-known adherend may be used. Examples thereof include cold-rolled steel sheets, galvanized steel sheets, aluminum/zinc alloy coated steel sheets, stainless steel sheets, aluminum sheets, aluminum alloy sheets, magnesium sheets, and magnesium alloy sheets. It is also possible to use products obtained by injection molding of magnesium.

No particular limitation is placed on the method of applying the photocurable elastomer composition to an adherend, and any conventionally-known method may be selected and used as appropriate. Coating may be performed, for example, with the photocurable elastomer composition subjected to temperature control, if necessary, and adjusted to a desired viscosity, and may be applied by gravure coating, roll coating, spin coating, reverse coating, bar coating, screen coating, blade coating, air knife coating, dipping, dispensing, and the like. The photocurable elastomer composition may be applied to an adherend, which in turn may be molded, if necessary, and irradiated with light to cure the photocurable elastomer composition. As a result, the gasket for hard disk drives may be produced.

The light for curing the photocurable elastomer composition may be selected appropriately from ultraviolet rays, visible light, or ionizing radiation including charged particle beams such as α-rays and β-rays, electromagnetic waves such as γ-rays, and high energy particles. As such light, ultraviolet rays are preferred from the viewpoint of operability, productivity, and economical efficiency.

Any conventionally-known ultraviolet source may be used, including, for example, a xenon lamp, a low-pressure mercury lamp, a high-pressure mercury lamp, a metal halide lamp, a microwave-driven excimer lamp.

The atmosphere for ultraviolet ray irradiation may be an air atmosphere, an atmosphere of an inert gas such as nitrogen gas and carbon dioxide gas, or an atmosphere at reduced oxygen concentrations. Among these, preferred are an atmosphere of an inert gas or an atmosphere at reduced oxygen concentrations. Irradiation atmosphere temperature may be adjusted appropriately, and may be typically 10° C. to 200° C.

Irradiation time may be adjusted appropriately, and is usually and preferably 10 seconds to 60 minutes. The cumulative amount of light may be adjusted appropriately, and is usually and preferably 1,000 mJ/cm$^2$ to 20,000 mJ/cm$^2$.

Hard Disk Drive

In the hard disk drive disclosed herein, at least a portion thereof may have the aforementioned gasket for hard disk drives.

The provision of the gasket for hard disk drives in at least a portion of the hard disk drive provides the hard disk drive with excellent durability and barrier properties as well as sufficient reworkability.

Examples

Examples of our products will be further described below. However, our products are not limited to the disclosed examples in any way.

Components are formulated as presented in Tables 1 to 6 (the results for each component are presented in parts by mass) to prepare respective photocurable elastomer compositions. Note that a hydrogenated styrene-butadiene copolymer presented in Tables 1 and 2 was prepared by a method described below. Then, hardness (flexibility), moisture permeability (barrier property), and compression set were measured and evaluated as indicated below. The results are shown in Tables 1 to 6.

Preparation of a Hydrogenated Styrene-Butadiene Copolymer

To a 7 L polymerization reactor after argon substitution were added 1.50 kg of dehydrated and purified cyclohexane, 2.00 kg of a solution of 22.9 mass % of a 1,3-butadiene monomer in hexane, 0.765 kg of a solution of 20.0 mass % of a styrene monomer in cyclohexane, and 209.4 mL of a solution of 1.6 mol/L of 2-2'-di(tetrahydrofuryl)propane in hexane. Then, 223.5 mL of 0.5 mol/L of a dilithium polymerization initiator was added to the mixture to initiate polymerization. The polymerization continued for 1.5 hours while heating the polymerization reactor to 50° C. Then, 220.4 mL of a solution of 1 mol/L of ethylene oxide in cyclohexane was added, followed by stirring for another 2 hours, and subsequently 50 mL of isopropyl alcohol was added. The solution of the polymer in hexane was precipitated in isopropyl alcohol, and sufficiently dried to form a styrene-butadiene copolymer. The resulting styrene-butadiene copolymer is a styrene-butadiene copolymer terminated with OH groups at both ends, and that has a styrene content of 25 mass %, a weight-average molecular weight of 7,100, and a molecular weight distribution of 1.25. Such styrene-butadiene copolymers were dissolved, 120 g each, in 1 L of fully dehydrated and purified hexane, respectively. Then, a catalyst solution, prepared in advance in a separate vessel, of nickel naphthenate-triethylaluminum-butadiene with a mixing ratio of 1:3:3 (in molar ratio), was charged to each copolymer solution so that nickel was 1 mol per 1000 mol of the butadiene portion in the copolymer solution. Hydrogen was added to the sealed reaction vessel under a pressure of 27,580 hPa (400 psi), and the hydrogenation reaction continued for 4 hours at 110° C. Then, the catalyst residue was extracted and separated with a 3N concentration hydrochloric acid, and further centrifuged for sedimentation. Thereafter, the resulting product of the styrene-butadiene copolymer was precipitated in isopropyl alcohol and sufficiently dried to obtain a hydrogenated styrene-butadiene copolymer.

Hardness (Flexibility)

Each photocurable elastomer composition was formed into a film have a thickness of about 2 mm, which in turn was irradiated with light using a metal halide lamp to form a sheet. Light irradiation was carried out under the conditions of illumination intensity of about 150 mW/cm$^2$ in an air atmosphere and a cumulative amount of light of about 9000 mJ/cm$^2$. The sheet was further subjected to baking treatment in an air atmosphere at 120° C. for 4 hours.

The hardness of this sheet was measured using a type A durometer in accordance with JIS K 6253. As test specimens, three sheets of material, each being about 2 mm thick, were laminated to form a laminate having a thickness of about 6 mm. In this case, a lower hardness represents a better result, and a preferred A hardness is 80 or less.

Moisture Permeability (Barrier Property)

For sheets having a thickness of about 1 mm, moisture permeability was measured using a moisture permeable cup as specified in the method A set forth in JIS L 1099, under the conditions of 50° C. and relative humidity of 90% in accordance with JIS Z 0208. In this case, a lower moisture permeability represents a better result, and a preferred moisture permeability is 10 [g/m²·day].

Compression Set

In accordance with JIS K 6262, five sheets, each cut into 2 cm square, 2-mm thick pieces, were stacked on top of one another to prepare measurement samples, and compression set was measured at the test temperature of 70° C. In this case, a lower compression set represents a better result, and preferred compression set is 50% or less.

TABLE 1

|   |   |   | Example |   |   |   |   |   |   |   |   |   |   |
|---|---|---|---|---|---|---|---|---|---|---|---|---|---|
|   |   |   | 1 | 2 | 3 | 4 | 5 | 6 | 7 | 8 | 9 | 10 | 11 |
| (A) | ethylene-propylene copolymer *1 | pts. by mass | 49 | 35 | 21 |   |   |   | 30 | 35 | 35 | 35 | 35 |
|   | hydrogenated polybutadiene A *2 |   |   |   |   | 35 |   |   |   |   |   |   |   |
|   | hydrogenated polybutadiene B *3 |   |   |   |   |   | 35 |   |   |   |   |   |   |
|   | hydrogenated styrene-butadiene copolymer *4 |   |   |   |   |   |   | 35 |   |   |   |   |   |
| (B) | methacrylic-modified polyisoprene *5 |   | 21 | 35 | 49 | 35 | 35 | 35 | 30 | 35 | 35 | 35 |   |
|   | acrylic-modified polybutadiene *6 |   |   |   |   |   |   |   |   |   |   |   | 35 |
| (C) | monomer A *7 |   | 30 | 30 | 30 | 30 | 30 | 30 | 40 |   |   |   | 30 |
|   | monomer B *8 |   |   |   |   |   |   |   |   | 30 |   |   |   |
|   | monomer C *9 |   |   |   |   |   |   |   |   |   | 30 |   |   |
|   | monomer D *10 |   |   |   |   |   |   |   |   |   |   | 30 |   |
| (D) | photopolymerization initiator *11 |   | 1 | 1 | 1 | 1 | 1 | 1 | 1 | 1 | 1 | 1 | 1 |
| (E) | fumed silica *12 |   | 5 | 5 | 5 | 5 | 5 | 5 | 6 | 5 | 5 | 5 | 5 |
| Others | urethane acrylate *13 |   |   |   |   |   |   |   |   |   |   |   |   |
|   | bisphenol A-type epoxy acrylate *14 |   |   |   |   |   |   |   |   |   |   |   |   |
|   | mass ratio (A):(B) |   | 70:30 | 50:50 | 30:70 | 50:50 | 50:50 | 50:50 | 50:50 | 50:50 | 50:50 | 50:50 | 50:50 |
|   | (C) × 100/{(A) + (B) + (C)} |   | 30 | 30 | 30 | 30 | 30 | 30 | 40 | 30 | 30 | 30 | 30 |
| Properties | hardness (A hardness) |   | 32 | 31 | 26 | 33 | 37 | 29 | 40 | 21 | 37 | 18 | 42 |
|   | moisture permeability (g/m² · day) |   | 3 | 6 | 8 | 5 | 5 | 4 | 6 | 7 | 5 | 9 | 3 |
|   | compression set (%) |   | 39 | 34 | 29 | 36 | 37 | 38 | 28 | 25 | 27 | 22 | 13 |

TABLE 2

|   |   |   | Comparative Example |   |   |   |   |   |   |   |
|---|---|---|---|---|---|---|---|---|---|---|
|   |   |   | 1 | 2 | 3 | 4 | 5 | 6 | 7 | 8 |
| (A) | ethylene-propylene copolymer *1 | pts. by mass | 56 | 14 | 20 |   |   | 70 |   |   |
|   | hydrogenated polybutadiene A *2 |   |   |   |   |   |   |   |   |   |
|   | hydrogenated polybutadiene B *3 |   |   |   |   |   |   |   |   |   |
|   | hydrogenated styrene-butadiene copolymer *4 |   |   |   |   |   |   |   |   |   |
| (B) | methacrylic-modified polyisoprene *5 |   | 14 | 56 | 20 | 70 |   |   |   |   |
|   | acrylic-modified polybutadiene *6 |   |   |   |   |   | 70 |   |   |   |
| (C) | monomer A *7 |   | 30 | 30 | 60 | 30 | 30 | 30 | 30 | 30 |
|   | monomer B *8 |   |   |   |   |   |   |   |   |   |
|   | monomer C *9 |   |   |   |   |   |   |   |   |   |
|   | monomer D *10 |   |   |   |   |   |   |   |   |   |
| (D) | photopolymerization initiator *11 |   | 1 | 1 | 1 | 1 | 1 | 1 | 1 | 1 |
| (E) | fumed silica* 12 |   | 5 | 5 | 8 | 5 | 5 | 5 | 5 | 5 |
| Others | urethane acrylate *13 |   |   |   |   |   |   |   | 70 |   |
|   | bisphenol A-type epoxy acrylate *14 |   |   |   |   |   |   |   |   | 70 |
|   | mass ratio (A):(B) |   | 80:20 | 20:80 | 50:50 | 0:100 | 0:100 | 100:0 | — | — |
|   | (C) × 100/{(A) + (B) + (C)} |   | 30 | 30 | 60 | 30 | 30 | 30 | 100 | 100 |
| Properties | hardness (A hardness) |   | 31 | 22 | >80 | 30 | >80 | not cured | 50 | >80 |
|   | moisture permeability (g/m² · day) |   | 5 | 11 | 8 | 14 | 16 |   | 24 |   |
|   | compression set (%) |   | 61 | 19 | *15 | 18 | *15 | not cured | 10 | *15 |

TABLE 3

| | | | | Example | | | | | | | | | | | |
|---|---|---|---|---|---|---|---|---|---|---|---|---|---|---|---|
| | | | | 12 | 13 | 14 | 15 | 16 | 17 | 18 | 19 | 20 | 21 | 22 | 23 | 24 |
| (A) | polybutene A *16 | pts. by mass | 49 | 35 | 21 | | | | | 30 | 35 | 35 | 35 | 35 | 35 |
| | polybutene B *17 | | | | | 35 | | | | | | | | | |
| | polybutene C *18 | | | | | | 35 | | | | | | | | |
| | hydrogenated high-vinyl polybutadiene A *19 | | | | | | | 35 | | | | | | | |
| | hydrogenated high-vinyl polybutadiene B *20 | | | | | | | | 35 | | | | | | |
| (B) | methacrylic-modified polyisoprene *5 | | 21 | 35 | 49 | 35 | 35 | 35 | 35 | 30 | 35 | 35 | 35 | | |
| | acrylic-modified polybutadiene *6 | | | | | | | | | | | | | 35 | |
| | hydrogenated acrylic-modified polybutadiene *21 | | | | | | | | | | | | | | 35 |
| (C) | monomer A *7 | | 30 | 30 | 30 | 30 | 30 | 30 | 30 | 40 | | | | 30 | 30 |
| | monomer B *8 | | | | | | | | | | 30 | | | | |
| | monomer C *9 | | | | | | | | | | | 30 | | | |
| | monomer D *10 | | | | | | | | | | | | 30 | | |
| (D) | photopolymerization initiator *11 | | 1 | 1 | 1 | 1 | 1 | 1 | 1 | 1 | 1 | 1 | 1 | 1 | 1 |
| (E) | fumed silica *12 | | 5 | 5 | 5 | 5 | 5 | 5 | 5 | 5 | 5 | 5 | 5 | 5 | 5 |
| Others | urethane acrylate *13 | | | | | | | | | | | | | | |
| | bisphenol A-type epoxy acrylate *14 | | | | | | | | | | | | | | |
| | mass ratio (A):(B) | | 70:30 | 50:50 | 30:70 | 50:50 | 50:50 | 50:50 | 50:50 | 50:50 | 50:50 | 50:50 | 50:50 | 50:50 | 50:50 |
| | (C) × 100/{(A) + (B) + (C)} | | 30 | 30 | 30 | 30 | 30 | 30 | 30 | 40 | 30 | 30 | 30 | 30 | 30 |
| Properties | hardness (A hardness) | | 39 | 39 | 36 | 44 | 51 | 49 | 56 | 54 | 31 | 54 | 41 | 57 | 61 |
| | moisture permeability (g/m² · day) | | 6 | 7 | 8 | 7 | 7 | 6 | 6 | 6 | 8 | 6 | 9 | 5 | 5 |
| | compression set (%) | | 35 | 28 | 22 | 27 | 25 | 25 | 24 | 27 | 19 | 28 | 29 | 15 | 22 |

TABLE 4

| | | | Comparative Example | | | | | | | |
|---|---|---|---|---|---|---|---|---|---|---|
| | | | 9 | 10 | 11 | 12 | 13 | 14 | 15 | 16 |
| (A) | polybutene A *16 | pts. by mass | 56 | 14 | 20 | | | 70 | | |
| | polybutene B *17 | | | | | | | | | |
| | polybutene C *18 | | | | | | | | | |
| | hydrogenated high-vinyl polybutadiene A *19 | | | | | | | | | |
| | hydrogenated high-vinyl polybutadiene B *20 | | | | | | | | | |
| (B) | methacrylic-modified polyisoprene *5 | | 14 | 56 | 20 | 70 | | | | |
| | acrylic-modified polybutadiene *6 | | | | | | 70 | | | |
| | hydrogenated acrylic-modified polybutadiene *21 | | | | | | | | | |
| (C) | monomer A *7 | | 30 | 30 | 60 | 30 | 30 | 30 | 30 | 30 |
| | monomer B *8 | | | | | | | | | |
| | monomer C *9 | | | | | | | | | |
| | monomer D *10 | | | | | | | | | |
| (D) | photopolymerization initiator *11 | | 1 | 1 | 1 | 1 | 1 | 1 | 1 | 1 |
| (E) | fumed silica *12 | | 5 | 5 | 5 | 5 | 5 | 5 | 5 | 5 |
| Others | urethane acrylate *13 | | | | | | | | 70 | |
| | bisphenol A-type epoxy acrylate *14 | | | | | | | | | 70 |
| | mass ratio (A):(B) | | 80:20 | 20:80 | 50:50 | 0:100 | 0:100 | 100:0 | — | — |
| | (C) × 100/{(A) + (B) + (C)} | | 30 | 30 | 60 | 30 | 30 | 30 | 100 | 100 |
| Properties | hardness (A hardness) | | 40 | 32 | >80 | 30 | >80 | 38 | 50 | >80 |
| | moisture permeability (g/m² · day) | | 5 | 11 | 8 | 14 | 16 | 5 | 24 | |
| | compression set (%) | | 64 | 21 | *15 | 18 | *15 | 90 | 10 | *15 |

TABLE 5

| | | | Example | | | | | | | | | | | |
|---|---|---|---|---|---|---|---|---|---|---|---|---|---|---|
| | | | 25 | 26 | 27 | 28 | 29 | 30 | 31 | 32 | 33 | 34 | 35 | 36 |
| (A) | SIBS *22 | pts. by mass | 38.5 | 35 | 21 | | | | 30 | 35 | 35 | 35 | 35 | 49 |
| | high-vinyl SEPS *23 | | | | | 35 | | | | | | | | |
| | SEEPS *24 | | | | | | 35 | | | | | | | |
| | SEBS *25 | | | | | | | 35 | | | | | | |

TABLE 5-continued

| | | 25 | 26 | 27 | 28 | 29 | 30 | 31 | 32 | 33 | 34 | 35 | 36 |
|---|---|---|---|---|---|---|---|---|---|---|---|---|---|
| (B) | methacrylic-modified polyisoprene *5 | 31.5 | 35 | 49 | 35 | 35 | 35 | 30 | 35 | 35 | 35 | | 21 |
| | acrylic-modified polybutadiene *6 | | | | | | | | | | | 35 | |
| (C) | monomer A *7 | 30 | 30 | 30 | 30 | 30 | 30 | 40 | | | | 30 | 30 |
| | monomer B *8 | | | | | | | | 30 | | | | |
| | monomer C *9 | | | | | | | | | 30 | | | |
| | monomer D *10 | | | | | | | | | | 30 | | |
| (D) | photopolymerization initiator *11 | 1 | 1 | 1 | 1 | 1 | 1 | 1 | 1 | 1 | 1 | 1 | 1 |
| (E) | fumed silica *12 | 4 | 4 | 4 | 4 | 4 | 4 | 4 | 4 | 4 | 4 | 4 | 4 |
| Others | urethane acrylate *13 | | | | | | | | | | | | |
| | bisphenol A-type epoxy acrylate *14 | | | | | | | | | | | | |
| | mass ratio (A):(B) | 55:45 | 50:50 | 30:70 | 50:50 | 50:50 | 50:50 | 50:50 | 50:50 | 50:50 | 50:50 | 50:50 | 70:30 |
| | (C) × 100/{(A) + (B) + (C)} | 30 | 30 | 30 | 30 | 30 | 30 | 40 | 30 | 30 | 30 | 30 | 30 |
| Properties | hardness (A hardness) | 47 | 47 | 43 | 48 | 56 | 53 | 54 | 44 | 57 | 40 | 59 | 48 |
| | moisture permeability (g/m² · day) | 6 | 7 | 8 | 7 | 7 | 6 | 6 | 8 | 6 | 8 | 5 | 4 |
| | compression set (%) | 35 | 30 | 24 | 31 | 27 | 28 | 25 | 24 | 27 | 31 | 20 | 72 |

TABLE 6

| | | | Comparative Example | | | | | | | | |
|---|---|---|---|---|---|---|---|---|---|---|---|
| | | | 17 | 18 | 19 | 20 | 21 | 22 | 23 | 24 | 25 |
| (A) | SIBS *1 | pts. by mass | 14 | 15 | 40 | | | 60 | | | 20 |
| | high-vinyl SEPS *2 | | | | | | | | | | |
| | SEEPS *3 | | | | | | | | | | |
| | SEBS *4 | | | | | | | | | | |
| (B) | methacrylic-modified polyisoprene *5 | | 56 | 15 | 40 | 70 | | | | | 20 |
| | acrylic-modified polybutadiene *6 | | | | | | 70 | | | | |
| (C) | monomer A *7 | | 30 | 70 | 20 | 30 | 30 | 40 | 30 | 30 | 60 |
| | monomer B *8 | | | | | | | | | | |
| | monomer C *9 | | | | | | | | | | |
| | monomer D *10 | | | | | | | | | | |
| (D) | photopolymerization initiator *11 | | 1 | 1 | | 1 | 1 | 1 | 1 | 1 | 1 |
| (E) | fumed silica *12 | | 4 | 4 | | 4 | 4 | 4 | 4 | 4 | 4 |
| Others | urethane acrylate *13 | | | | | | | | 70 | | |
| | bisphenol A-type epoxy acrylate *14 | | | | | | | | | 70 | |
| | mass ratio (A):(B) | | 20:80 | 50:50 | 50:50 | 0:100 | 0:100 | 100:0 | — | — | 50:50 |
| | (C) × 100/{(A) + (B) + (C)} | | 30 | 70 | 20 | 30 | 30 | 40 | 100 | 100 | 60 |
| Properties | hardness (A hardness) | | 41 | >80 | *26 | 30 | >80 | *26 | 50 | >80 | 75 |
| | moisture permeability (g/m² · day) | | 10 | 7 | | 14 | 16 | | 24 | | 5 |
| | compression set (%) | | 20 | *15 | *26 | 18 | *15 | *26 | 10 | *15 | 41 |

*1 ethylene-propylene copolymer: LUCANT HC-3000X available from Mitsui Chemicals, Inc. (number-average molecular weight: 3,000)

*2 hydrogenated polybutadiene A: KRASOL HLBH-P2000 available from Arkema Inc. (number-average molecular weight: 2,000)

*3 hydrogenated polybutadiene B: KRASOL HLBH-P3000 available from Arkema Inc. (number-average molecular weight: 3,000)

*4 hydrogenated styrene-butadiene copolymer: for details, see the related description above.

*5 methacrylic-modified polyisoprene: UC-102 available from Kuraray Co., Ltd. (number-average molecular weight: 17,000, the number of methacrylic groups: 2)

*6 acrylic-modified polybutadiene: CN-307 available from Arkema Inc. (number-average molecular weight: 3,500, the number of acrylic groups: 2)

*7 monomer A: IBXA available from Osaka Organic Chemical Industry Ltd. (isobornyl acrylate, mono-functional acrylate)

*8 monomer B: Light Acrylate L-A available from Kyoeisha Chemical Co., Ltd. (lauryl acrylate, mono-functional acrylate)

*9 monomer C: FANCRYL FA-513AS available from Hitachi Chemical Co., Ltd. (dicyclopentanyl acrylate, mono-functional acrylate)

*10 monomer D: Light Acrylate IA-A available from Kyoeisha Chemical Co., Ltd. (isoamyl acrylate, methacrylate)

*11 photopolymerization initiator: Irgacure 184 available from BASF

*12 fumed silica: HDK N20 available from Asahi Kasei Wacker Silicone Co., Ltd.

*13 urethane acrylate: Light Tack PUA-KH32M available from Kyoeisha Chemical Co., Ltd.

*14 bisphenol A-type epoxy acrylate: CN104LC available from Arkema Inc.

*15 unable to measure due to cracking

*16 polybutene A: HV-100 available from JX Nippon Oil & Energy Corporation (number-average molecular weight: 980)

*17 polybutene B: HV-300 available from JX Nippon Oil & Energy Corporation (number-average molecular weight: 1,400)

*18 polybutene C: HV-1900 available from JX Nippon Oil & Energy Corporation (number-average molecular weight: 2,900)

*19 hydrogenated high-vinyl polybutadiene A: BI-2000 available from Nippon Soda Co., Ltd. (number-average molecular weight: 2,100, 1,2-bond: 70% or more)

*20 hydrogenated high-vinyl polybutadiene B: BI-3000 available from Nippon Soda Co., Ltd. (number-average molecular weight: 3,100, 1,2-bond: 70% or more)

*21 hydrogenated acrylic-modified polybutadiene: TEAI-1000 available from Nippon Soda Co., Ltd. (number-average molecular weight: 2,000, terminated with acrylic groups at both ends)

*22 SIBS: SIBSTAR 073T available from Kaneka Corporation

*23 high-vinyl SEPS: HYBRAR 7125 available from Kuraray Co., Ltd.

*24 SEEPS: SEPTON 2007 available from Kuraray Co., Ltd.

*25 SEBS: SEPTON 8007 available from Kuraray Co., Ltd.

*26 failed to turn into liquid form, unable to mold

Example Overview

It can be seen from Tables 1, 3, and 5 that the examples according to the disclosure all provided photocurable elastomer compositions excellent in hardness (flexibility) and barrier properties and having low compression set. Comparing the comparative examples presented in Table 2 with the examples in Table 1, it can be seen from Comparative Examples 2, 4, and 5 that barrier properties are unfavorable where the mass ratio, (A):(B), is outside of the range disclosed herein due to inadequacy or absence of the component (A), and from Comparative Examples 1 and 6 that compression set properties are unfavorable where the mass ratio, (A):(B), is outside of the range disclosed herein due to inadequacy or absence of the component (B). In particular, for Comparative Example 5 which does not contain the component (A), flexibility and compression set are also unfavorable. Further, it can be seen from Comparative Examples 7 and 8 that it is not possible to achieve good flexibility, good barrier properties, and good compression set properties at the same time where a conventional urethane acrylate or the like is used instead of the components (A) and (B) disclosed herein, and from Comparative Example 3 that flexibility and compression set properties are unfavorable where the proportion of the component (C) is outside of the range disclosed herein.

In addition, comparing the comparative examples presented in Table 4 with the examples in Table 3, it can be seen from Comparative Examples 10, 12, and 13 that barrier properties are unfavorable where the mass ratio, (A):(B), is outside of the range disclosed herein due to inadequacy or absence of the component (A), and from Comparative Examples 9 and 14 that compression set properties are unfavorable where the mass ratio, (A):(B), is outside of the range disclosed herein due to inadequacy or absence of the component (B). In particular, for Comparative Example 13 which does not contain the component (A), flexibility and compression set are also unfavorable. Further, it can be seen from Comparative Examples 15 and 16 that it is not possible to achieve good flexibility, good barrier properties, and good compression set properties at the same time where a conventional urethane acrylate or the like is used instead of the components (A) and (B) disclosed herein, and from Comparative Example 11 that flexibility and compression set properties are unfavorable where the proportion of the component (C) is outside of the range disclosed herein.

In addition, comparing the comparative examples presented in Table 6 with the examples in Table 5, it can be seen from Comparative Examples 17, 20, and 21 that barrier properties are unfavorable where the mass ratio, (A):(B), is outside of the range disclosed herein due to inadequacy or absence of the component (A), and from Comparative Example 22 that compression set properties are unfavorable where the mass ratio, (A):(B), is outside of the range disclosed herein due to absence of the component (B). In particular, for Comparative Example 21 which does not contain the component (A), flexibility and compression set properties are also unfavorable. Further, it can be seen from Comparative Examples 23 and 24 that it is not possible to achieve good flexibility, good barrier properties, and good compression set properties at the same time where a conventional urethane acrylate or the like is used instead of the components (A) and (B) disclosed herein, from Comparative Example 18 that flexibility and compression set properties are unfavorable where the proportion of the component (C) is outside of the range disclosed herein, and from Comparative Example 19 that the composition fails to turn into liquid form and is unable to mold in the absence of the component (D).

The invention claimed is:

1. A photocurable elastomer composition comprising:
(A)
   a styrene-based thermoplastic elastomer selected from the group consisting of a polystyrene-polybutadiene-polystyrene block copolymer, a polystyrene-polyisoprene-polystyrene block copolymer, a polystyrene-poly(vinyl/polyisoprene)-polystyrene block copolymer, a polystyrene-poly(isoprene/ethylene)-polystyrene block copolymer, and partially hydrogenated products thereof; and a polystyrene-polyisobutylene-polystyrene block copolymer, a polystyrene-poly(ethylene/butylene)-polystyrene block copolymer, a polystyrene-poly(ethylene/propylene)-polystyrene block copolymer, a polystyrene-poly(vinyl/ethylene/propylene)-polystyrene, and a polystyrene-poly(ethylene/ethylene/propylene)-polystyrene;
(B) a polymer having two or more reactive functional groups per molecule and containing, in its molecule, 80% or more of units derived from polyisoprene, the reactive functional groups being of at least one type selected from the group consisting of (meth)acrylic group, vinyl group, vinylidene group, and maleimide group;
(C) a (meth)acrylate monomer;
(D) a photopolymerization initiator; and
(E) at least one selected from an inorganic filler or an organic filler,
wherein the mass ratio of the component (A) to the component (B) ((A):(B)) is from 25:75 to 75:25, and the content of the component (C) is 50 mass % or less based on the total amount of the components (A), (B), and (C).

2. The photocurable elastomer composition according to claim 1, wherein the component (C) is at least one (meth)acrylate selected from the group consisting of hydrocarbon (meth)acrylate having 6 or more carbon atoms, isobornyl (meth)acrylate, and (meth)acrylate derived from dicyclopentadiene.

3. The photocurable elastomer composition according to claim 1, wherein the component (E) is a fumed silica.

4. The photocurable elastomer composition according to claim 1, wherein the photocurable elastomer composition is used for a gasket for hard disk drives.

5. A gasket for hard disk drives, the gasket using the photocurable elastomer composition according to claim 1 in at least a portion thereof.

6. A hard disk drive comprising the gasket for hard disk drives according to claim 5 in at least a portion thereof.

* * * * *